(12) United States Patent
Xia

(10) Patent No.: US 8,373,423 B2
(45) Date of Patent: Feb. 12, 2013

(54) IEEE 1394 INTERFACE TEST APPARATUS

(75) Inventor: Xu Xia, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 394 days.

(21) Appl. No.: 12/871,013

(22) Filed: Aug. 30, 2010

(65) Prior Publication Data

US 2012/0032685 A1 Feb. 9, 2012

(30) Foreign Application Priority Data

Aug. 3, 2010 (CN) .......................... 2010 1 0243695

(51) Int. Cl.
*G01R 31/02* (2006.01)
(52) U.S. Cl. ....................................................... 324/543
(58) Field of Classification Search ........... 324/538–544
See application file for complete search history.

(56) References Cited

U.S. PATENT DOCUMENTS

| | | | | |
|---|---|---|---|---|
| 8,290,735 B2 * | 10/2012 | Wang | ............................ | 702/117 |
| 2004/0015738 A1 * | 1/2004 | Chang | ............................ | 714/30 |
| 2007/0089013 A1 * | 4/2007 | Qiu et al. | ...................... | 714/742 |
| 2010/0141266 A1 * | 6/2010 | Cui et al. | ...................... | 324/538 |
| 2011/0173502 A1 * | 7/2011 | Cao | ................................. | 714/43 |

* cited by examiner

*Primary Examiner* — Patrick Assouad
*Assistant Examiner* — Alesa Allgood
(74) *Attorney, Agent, or Firm* — Altis Law Group, Inc.

(57) ABSTRACT

An Institute of Electrical and Electronics Engineers (IEEE) test apparatus includes an IEEE 1394 chip, an IEEE 1394 plug, an IEEE 1394 outlet, a test header, and a switch module. The IEEE 1394 chip, plug and outlet each include a ground pin, two pairs of differential signal pins, and a power pin. The test header includes ground pin sockets, two pairs of differential signal pin sockets, and a power signal pin socket. The three power pins and the power signal pin socket are electrically connected together. The switch module is operable to electrically connect the two pairs of differential signal pins of the IEEE 1394 chip to the two pairs of differential signal pins of the IEEE 1394 plug or electrically connect the two pairs of differential signal pins of the IEEE 1394 chip to the two pairs of differential signal pins of the IEEE 1394 outlet.

5 Claims, 2 Drawing Sheets

IEEE 1394 INTERFACE TEST APPARATUS

BACKGROUND

1. Technical Field

The present disclosure relates to test apparatuses, and particularly to a test apparatus to test Institute of Electrical and Electronics Engineers (IEEE) 1394 interfaces.

2. Description of Related Art

The IEEE 1394 interface is a serial bus interface standard for high-speed communications and isochronous real-time data transfer, frequently used in personal computers, as well as in digital audio, digital video, automotive, and aeronautical applications. Before shipment, IEEE 1394 interfaces should be tested. A common method to test IEEE 1394 interfaces requires the use of an IEEE 1394 device known to be working properly along with an oscillograph. However, the IEEE 1394 device is expensive and not easy to use with the oscillograph.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
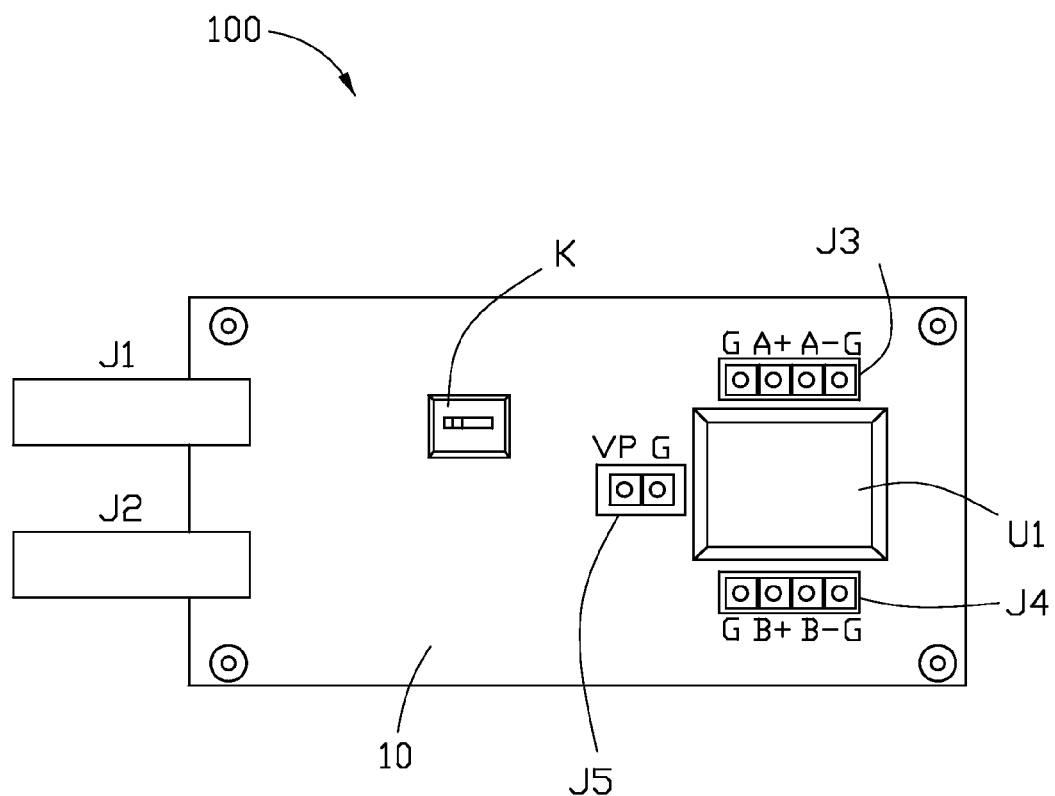
FIG. 1 is a schematic view of an embodiment of an Institute of Electrical and Electronics Engineers (IEEE) 1394 interface test apparatus.

Referring to FIG. 1, an embodiment of an Institute of Electrical and Electronics Engineers (IEEE) 1394 interface test apparatus 100 includes an IEEE 1394 chip U1, an IEEE 1394 plug J1, an IEEE 1394 outlet J2, a switch module K, and three test headers J3-J5. All the above elements are installed on a circuit board 10.

The test header J3 includes two ground pin sockets G and a pair of differential signal pin sockets A+ and A−. The test header J4 includes two ground pin sockets G and a pair of differential signal pin sockets B+ and B−. The test header J5 includes a power signal pin socket VP and a ground pin socket G. Each non-ground pin socket (A+, A−, B+, B−, VP) is arranged next a ground pin socket G, for convenient insertion of two test probes of a tester, such as an oscillograph, into the non-pin socket and the ground pin socket.

Figure 2:
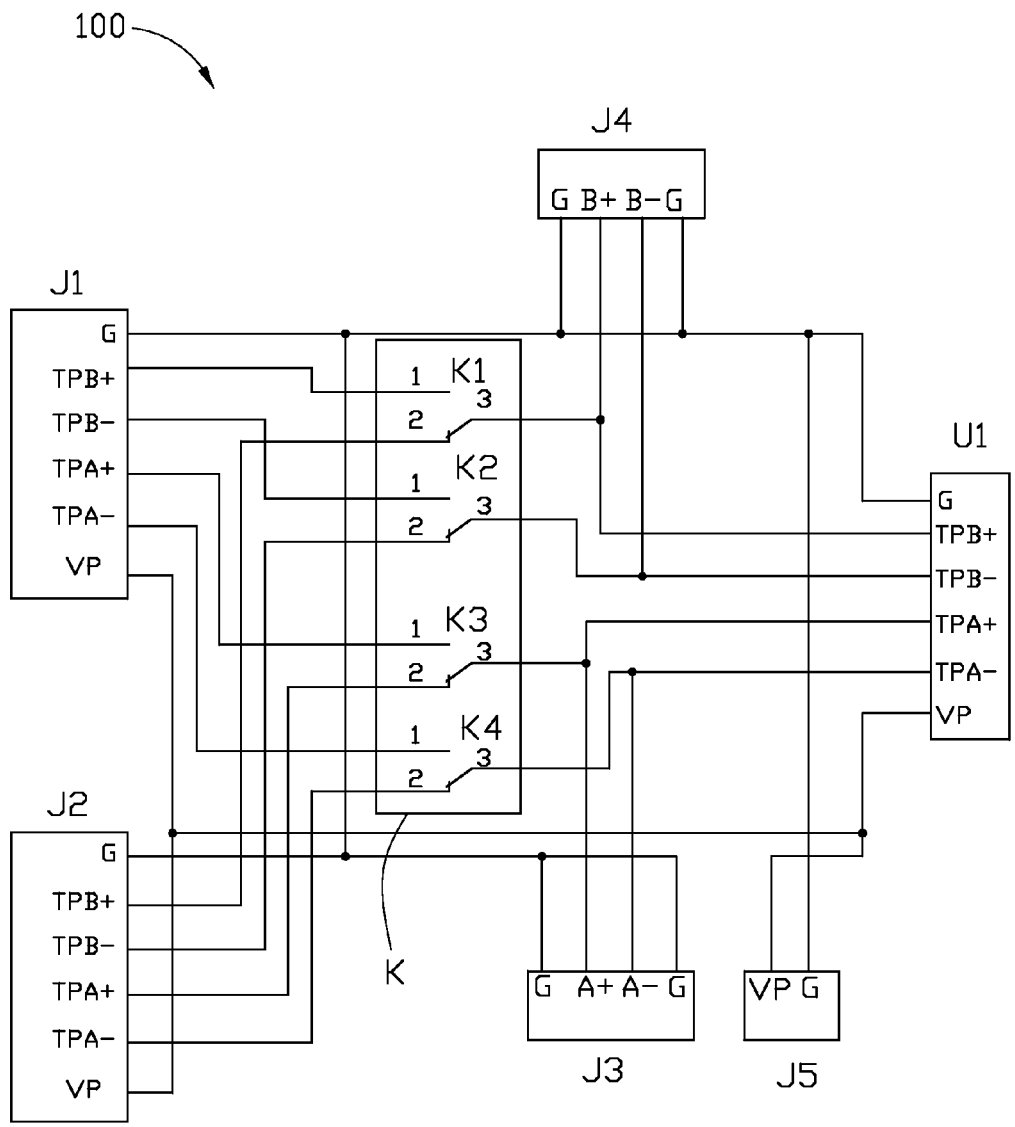
FIG. 2 is a circuit diagram of the IEEE 1394 interface test apparatus of FIG. 1.

Referring to FIG. 2, the IEEE 1394 chip U1, the IEEE 1394 plug J1, and the IEEE 1394 outlet J2 each include a ground pin G, a first pair of differential signal pins TPB+ and TPB−, a second pair of differential signal pins TPA+ and TPA−, and a power pin VP. The switch module K includes four single-pole double-throw (SPDT) switches K1-K4. The switches K1-K4 each include two throws 1 and 2, and a pole 3.

The ground pins G of the IEEE 1394 chip U1, the IEEE 1394 plug J1, and the IEEE 1394 outlet J2 and the ground pin sockets G of the test header J3-J5 are connected together. The power pins VP of the IEEE 1394 chip U1, the IEEE 1394 plug J1, and the IEEE 1394 outlet J2 and the power pin socket VP of the test header J5 are connected together. The signal pins TPB+, TPB−, TPA+, and TPA− of the IEEE 1394 plug J1 are respectively connected to the throws 1 of the SPDT switches K1-K4. The signal pins TPB+, TPB−, TPA+, and TPA− of the IEEE 1394 outlet J2 are respectively connected to the throws 2 of the SPDT switches K1-K4. The pole 3 of the SPDT switch K1 is connected to the pin socket B+ of the test header J4 and the signal pin TPB+ of the IEEE 1394 chip U1. The pole 3 of the SPDT switch K2 is connected to the pin socket B− of the test header J4 and the signal pin TPB− of the IEEE 1394 chip U1. The pole 3 of the SPDT switch K3 is connected to the pin socket A+ of the test header J3 and the signal pin TPA+ of the IEEE 1394 chip U1. The pole 3 of the SPDT switch K4 is connected to the pin socket A− of the test header J3 and the signal pin TPA− of the IEEE 1394 chip U1.

In use to test an IEEE 1394 interface of an electronic device, if the test apparatus 100 is located near to the electronic device, the IEEE 1394 plug J1 is inserted in the IEEE 1394 interface of the electronic device. The SPDT switches K1-K4, which are electrically connected to the throws 1, are switched to the poles 3, therefore the IEEE 1394 plug J1 is electrically connected to the IEEE 1394 chip U1. An operator can use two test probes of an oscillograph to test the IEEE 1394 interface of the electronic device by inserting the test probes in two corresponding pin sockets of the test apparatus 100. If the test apparatus 100 is located far away from the electronic device, the IEEE 1394 outlet J2 is connected to the IEEE 1394 interface of the electronic device through an IEEE 1394 cable. The SPDT switches K1-K4, which are electrically connected to the throws 2, are switched to the poles, therefore the IEEE 1394 outlet J2 is electrically connected to the IEEE 1394 chip U1. The operator can use the test probes of the oscillograph to test the IEEE 1394 interface of the electronic device by inserting the test probes in two corresponding pin sockets of the test apparatus 100, which is very convenient.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. An Institute of Electrical and Electronics Engineers (IEEE) test apparatus comprising:
    an IEEE 1394 chip comprising a ground pin, two pairs of first differential signal pins, and a power pin;
    an IEEE 1394 plug comprising a ground pin, two pairs of second differential signal pins, and a power pin;
    an IEEE 1394 outlet comprising a ground pin, two pairs of third differential signal pins, and a power pin;
    at least two test headers comprising at least one ground pin socket, two pairs of differential signal pin sockets, a power signal pin socket, wherein the three power pins and the power signal pin socket are electrically connected together; and
    a switch module connected between the IEEE 1394 chip and each of the IEEE 1394 plug and the IEEE 1394 outlet, wherein the switch module is operable to electrically connect the two pairs of first differential signal pins of the IEEE 1394 chip to the two pairs of second differential signal pins of the IEEE 1394 plug or electrically connect the two pairs of first differential signal pins of the IEEE 1394 chip to the two pairs of third differential signal pins of the IEEE 1394 outlet.

2. The IEEE test apparatus of claim 1, wherein the IEEE 1394 chip, the IEEE 1394 plug, the IEEE 1394 outlet, the at least one test header, and the switch module are installed on a circuit board.

3. The IEEE test apparatus of claim 2, wherein each of the two pairs of differential signal pin sockets and the power signal pin socket of the test header is located next to one of the at least one ground pin socket.

4. The IEEE test apparatus of claim 1, wherein the at least one test header comprises first to third test headers, the first test header comprises two ground pin sockets, one of the two pairs of differential signal pin sockets, the second test header comprises two ground pin sockets, the other one of the two pairs of differential signal pin sockets, the third test header comprises a ground pin socket and the power signal pin socket.

5. The IEEE test apparatus of claim 1, wherein the switch module comprises four single-pole double-throw (SPDT) switches, the four SPDT switches each comprise first and second throws, and a pole, the two pairs of first differential signal pins of the IEEE 1394 chip are respectively connected to the poles of the SPDT switches, the pairs of first differential signal pins of the IEEE 1394 plug are respectively connected to first throws of the SPDT switches, the pairs of second differential signal pins of the IEEE 1394 outlet are respectively connected to second throws of the SPDT switches.

* * * * *